United States Patent [19]

Fricke et al.

[11] Patent Number: 5,562,755

[45] Date of Patent: Oct. 8, 1996

[54] PROCESS FOR THE TREATMENT OF LANGBEINITE AND ANHYDRITE CONTAINING KIESERITE CONCENTRATES

[75] Inventors: Günter Fricke, Hersfeld; Ingo Stahl, Vellmar; Peter-M. Beier, Philippsthal, all of Germany

[73] Assignee: Kali und Salz Beteiligungs AG, Kassel, Germany

[21] Appl. No.: 359,443

[22] Filed: Dec. 20, 1994

[30] Foreign Application Priority Data

Dec. 21, 1993 [DE] Germany ............... 43 43 625.0

[51] Int. Cl.$^6$ ..................................... B03C 3/30
[52] U.S. Cl. .................. 95/58; 95/60; 96/17; 96/52; 96/74; 209/127.2; 209/127.4
[58] Field of Search ................ 95/58, 60, 118, 95/91; 96/17, 52, 74, 118; 209/127.2, 127.4

[56] References Cited

U.S. PATENT DOCUMENTS 3,493,109  2/1970  Carta et al. ............... 96/17 X
3,802,556  4/1974  Fricke et al. ............... 209/127.4 X
4,557,827  12/1985  Fricke et al. ............... 209/127.4
4,767,506  8/1988  Fricke ............... 209/127.4
5,251,762  10/1993  Taylor et al. ............... 209/127.4

FOREIGN PATENT DOCUMENTS 3334665  10/1984  Germany .
4200167  5/1993  Germany .
2166067  4/1986  United Kingdom ............... 209/127.4

*Primary Examiner*—Richard L. Chiesa
*Attorney, Agent, or Firm*—Collard & Roe, P.C.

[57] ABSTRACT

A process for after-purifying a kieserite mixture pre-concentrated electrostatically across a number of stages is characterized in that the outside air used in the after purification stage is adjusted by dehumidification in a conventional dehumidification plant to an absolute moisture of 4.5 g/m$^3$, and the kieserite mixture to be separated by triboelectrically charging with said air at a temperature of below 40° C.

6 Claims, No Drawings

4,562,755

PROCESS FOR THE TREATMENT OF LANGBEINITE AND ANHYDRITE CONTAINING KIESERITE CONCENTRATES

BACKGROUND OF THE INVENTION

1. Field of the Invention

A process for after-purifying a kieserite pre-concentrated electrostatically across a number of stages, is characterized in that the outside air used in the after-purification stage is adjusted by dehumidification in a conventional dehumidification plant to an absolute moisture of below 4.5 g/m$^3$, and the kieserite mixture to be separated is triboelectrically charged with said air at a temperature of below 40° C.

2. The Prior Art

It is part of the state of the art to isolate the mineral kieserite (i.e. $MgSO_4.H_2O$) from hard salts of potassium deposits with the help of the dry electrostatic separation process. For this purpose, the crude salt, which is recovered by mining, is ground, screened to a predetermined grain size, provided with a small quantity of conditioning agent mostly of the organic type, and eddied with air of a certain temperature and humidity. In this way, a charge with the opposite sign is produced on the particles, and the mixture is separated in the electrostatic field.

The major part of the kieserite so obtained has fertilizer quality and is sold as such on the market, but considerable quantities are also processed further to potassium sulfate.

But a small proportion of the kieserite is also required with a higher purity. This mainly requires the removal of residual amounts of langbeinite (i.e. $K_2SO_4.2\ MgSO_4$) and anhydrite (i.e. $CaSO_4$).

DE-PS 33 34 665 describes an electrostatic process, according to which a langbeinite- and anhydrite-containing kieserite product is separated into a fraction rich in langbeinite and anhydrite, and a fraction with low langbeinite and anhydrite contents. According to the state of the art, a kieserite fraction is obtained from crude salt in a multi-stage electrostatic process. This fraction is chemically conditioned with 35 to 100 g/ton of parahalogen-benzoic acid or hydroxy-benzoic acid, and charged triboelectrically in a fluidized-bed heater at 55° to 80° C.

The separation takes place in an electrostatic freefall separator, which can be equipped with plate, belt or tube separators, at a field intensity of 4 to 7 kV/cm. The langbeinite- and anhydrite-rich fraction is collected on the positive electrode, and the low-langbeinite and low-anhydrite fraction on the negative electrode.

The drawback of this prior art process is that it has to be carried out at elevated temperatures, or that a chemical after-conditioning is required. Both requirements are very costly and may hinder the further treatment or use of the product produced.

Furthermore, it is known that the relative air humidity plays a decisive role in electrostatic separation. The relative humidity of the air (calculated in %), however, always depends also on the absolute moisture of the air (calculated in g/m$^3$). Usually, the outside open air is used (for cost reasons) because it happens to be the cheapest source. However, in doing so, one depends on the value of the absolute moisture prevailing at a given time, and such value may vary greatly depending on the time of the year and the weather conditions. The only possibility of evading such circumstances is to control the relative humidity of the air via its temperature. In this connection, one has to take into account that with identical relative air humidity, the amount of water covering the surface of the salt decreases with the increase in temperature. This, however, is of decisive importance for triboelectric charging.

SUMMARY OF THE INVENTION

Now, tests have shown that instead of supplying heat, as it was usually done heretofore, followed by the intended charging, the relative air humidity (below 7.5%) can be adjusted also by dehumidifying the air. The present invention is based upon the discovery that by dehumidifying the feed air to the fluidized bed, the separation conditions are optimized with respect to the degree of surface coverage of the salt with water due to the lower temperatures (<40° C.). The consequence of this is that surprisingly, chemical after conditioning is no longer required at this point.

Now, a process has been found for after-purifying a kieserite that has been pre-concentrated electrostatically across a number of stages, whereby known conditioning agents such as, for example salicylic acid and fatty acids are used and the known charging conditions such as temperatures and relative humidities of the air are applied, and a substituted benzoic acid is added as conditioning agent for the after-purification, if need be, whereby the outside air used in the after-purification stage is adjusted by dehumidification with a conventional dehumidification plant to an absolute moisture of below 4.5 g/m$^3$ and the kieserite mixture to be separated is triboelectrically charged with said air at a temperature of below 40° C.

In a preferred embodiment of the process, the dihydroxybenzoic acid is mixed with the salt in an amount of from 20 to 50 g/ton; the outside air is adjusted to an absolute moisture of 3.5 to 4.5 g/m$^3$, and the temperature is adjusted to 35° to 40° C.

According to another embodiment, the outside air is adjusted to an absolute moisture of 2 to 2.5 g/m$^3$; the temperature is adjusted to 25° to 30° C., and the further addition of a conditioning agent is entirely omitted.

Other objects and features of the present invention will become apparent from the following detailed description in connection with the accompanying examples considered which discloses several embodiments of the present invention. It should be understood, however, that the examples are designed for the purpose of illustration only and not as a definition of the limits of the invention.

DETAILED DESCRIPTION OF PREFERRED EMBODIMENTS

EXAMPLES

The examples of the table relate to the recovery of a low-langbeinite and low-anhydrite kieserite concentrate from an ESTA-kieserite with about 5.0% langbeinite and about 0.4% anhydrite, at an absolute air humidity of 9 g/m$^3$ in a tubular free-fall separator.

The above ESTA-kieserite was produced under the following conditions:

(a) NaCl-separation:

conditioning agent: salicylic acid (75 g/t)+glycolic acid (20 g/t)

relative: moisture 10% temperature: 51° C.

(b) Potassium-kieserite separation:

conditioning agent: fatty acid (50 g/t)

relative moisture: 5%
temperature: 68° C.
(c) Kieserite purification:
conditioning agent: fatty acid (50 g/t)
relative moisture: 5%
temperature: 68° C.

In comparative tests 1 and 2, the relative moisture was adjusted by the addition of heat, and chemically conditioned according to the process according to the state of the art. In test 1 (conditioning agent: 50 g 4-chlorobenzoic acid/ton ESTA-kieserite charged), the langbeinite and anhydrite collected in the fraction on the positive electrode amounts to 97.4% and 66.0%, respectively.

In test 2 (conditioning agent: 50 g 2,4-dihydroxy-benzoic acid/ton of ESTA-kieserite charged), the amount of langbeinite collected was, as compared to test 1, lower by 7.5 percentage points, and came to only 89.9%. This, however, is compensated by the higher anhydrite yield, which, with 90.0%, was higher by 24.0 percentage points.

Tests 3 and 4 were carried out with air dehumidification according to the process of the invention. In test 3, in which chemical conditioning was additionally carried out with 2,4-dihydroxy-benzoic acid, the langbeinite collected in the fraction on the positive electrode came to 98.8%, and the anhydrite collected came to 88.9%.

These values are clearly superior to those achievable according to the process according to the state of the art.

In test 4, chemical conditioning was omitted. The langbeinite and anhydrite yields in the P-fraction came to 94.1% and 90.0%, respectively. These results are slightly lower than those in test 3; however, they are still higher than the results of the process according to the state of the art.

From the above test results, it can be concluded that as opposed to the process according to the state of the art, additional chemical conditioning can be omitted in the process according to the invention.

In all tests, the fraction on the negative electrode represents a high-quality pure kieserite product (langbeinite content below 1.80%; anhydrite content below 0.25%).

The air is dehumidified by conventional air dryers. Such dryers operate on the principle of physical adsorption: water vapor from the air to be dried is retained by adhesion on the surface of a solid hygroscopic substance (adsorption agent). Subsequently, the adsorption agent is heated and the previously absorbed water vapor is removed (regeneration).

Silica gel ($SiO_2$) and aluminum oxide ($Al_2O_3$) are the most widely used adsorption agents in industrial drying.

The installations are operated continuously, whereby individual chambers are, upon exhaustion, switched to regeneration.

The results are set forth in the following table.

TABLE

| | Tests No. | | | |
| --- | --- | --- | --- | --- |
| | STATE OF THE ART | | INVENTION | |
| Test No. | 1 | 2 | 3 | 4 |
| Test Conditions: | | | | |
| Chemical conditioning | 4-chloro-benzoic acid | 2,4-di-hydroxy-benzoic acid | 2,4-di-hydroxy-benzoic acid | — |
| Air dehumidification | no | no | yes | yes |
| Absolute air moisture prior to dehumidification in $g/m^3$ | 9.0 | 9.0 | 9.0 | 9.0 |
| Absolute air moisture after dehumidification in $g/m^3$ | — | — | 3.8 | 2.2 |
| rel. air humidity in % | 7.5 | 7.5 | 8.0 | 7.5 |
| Temperature in °C. | 58 | 58 | 38 | 29 |
| Product charged: | | | | |
| Eff. quantity in % | 100 | 100 | 100 | 100 |
| Langbeinite content in % | 5.29 | 4.78 | 4.17 | 6.03 |
| Anhydrite content in % | .39 | .41 | .33 | .36 |
| P-Fraction: | | | | |
| Eff. quantity in % | 43.1 | 49.3 | 48.2 | 48.5 |
| Langbeinite content in % | 11.95 | 8.72 | 8.55 | 11.69 |
| Langbeinite yield in % | 97.4 | 89.9 | 98.8 | 94.1 |
| Anhydrite content in % | .59 | .74 | .60 | .67 |
| Anhydrite yield in % | 66.0 | 90.0 | 88.9 | 90.0 |
| N-Fraction: | | | | |
| Eff. quantity in % | 56.9 | 50.7 | 51.8 | 51.5 |
| Langbeinite content in % | .24 | .95 | .10 | .69 |
| Langbeinite yield in % | 2.6 | 10.1 | 1.2 | 5.9 |
| Anhydrite content in % | .23 | .08 | .07 | .07 |
| Anhydrite yield in % | 34.0 | 10.0 | 11.1 | 10.0 |

While several embodiments of the present invention have been shown and described, it is to be understood that many changes and modifications may be made thereunto without departing from from the spirit and scope of the invention as described in the appended claims.

What is claimed is:

1. Process for after-purifying a kieserite mixture preconcentrated electrostatically across a number of stages in the presence of a conditioning agent and containing langbeinite and anhydrite, which comprises an additional electrostatic separation step in which the preconcentrated kieserite mixture in atmospheric air is triboelectrically charged by using a conditioning agent in the form of a substituted benzoic acid, and is separated into a langbeinite-anhydrite-poor kieserite fraction and into a langbeinite-anhydrite-rich fraction, wherein the atmospheric air used in the additional separation step is dehumidified and added with an absolute humidity of below 4.5 $g/m^3$ and that the process takes place at a temperature of under 40° C.

2. Process according to claim 1, wherein 2,4-dihydroxybenzoic acid in an amount of 20–50 g/t is used as conditioning agent in the purification stage, the absolute humidity of the air is brought to 3.5 to 4.5 $g/m^3$ with dehumidification, and the triboelectric charging and separation takes place at 35° C. to 40° C.

3. Process according to claim 1, wherein the absolute humidity of air is brought to 2 to 2.5 $g/m^3$ and the after-purification takes place without conditioning agent at temperatures of 25° C. to 30° C.

4. Process for after-purifying a kieserite mixture preconcentrated electrostatically across a number of stages, comprising providing a kieserite mixture comprising kieserite, langbeinite and anhydrite;

adjusting outside air used in an after purification stage by dehumidification to an absolute moisture of below 4.5 g/m$^3$;

charging the kieserite mixture to be separated by triboelectrically charging with said air at a temperature of below 40° C.; and electrostatically separating the kieserite mixture into two fractions, one of said fractions being langbeinite-anhydrite-poor and the other of said fractions being langbeinite-anhydrite-rich.

5. Process according to claim 4, comprising carrying out the mixture by mixing with 20 to 50 g/t of 2,4-dihydroxy-benzoic acid;

and adjusting the outside air to an absolute moisture of 3.5 to 4.5 g/m$^3$ by dehumidification; and triboelectric charging and separating taking place at a temperature of 35° C. to 40° C.

6. Process according to claim 4, comprising adjusting the outside air to an absolute moisture of 2 to 2.5 g/m$^3$; and after purifying the kieserite mixture at a temperature adjusted to 25° C. to 30° C., without a conditioning agent being used.

\* \* \* \* \*